April 26, 1932.  R. R. SHERER  1,855,928
COMPUTING SCALE
Filed July 31, 1930   2 Sheets-Sheet 1

INVENTOR,
Raymond R. Sherer,
BY Howard S. Smith,
His ATTORNEY

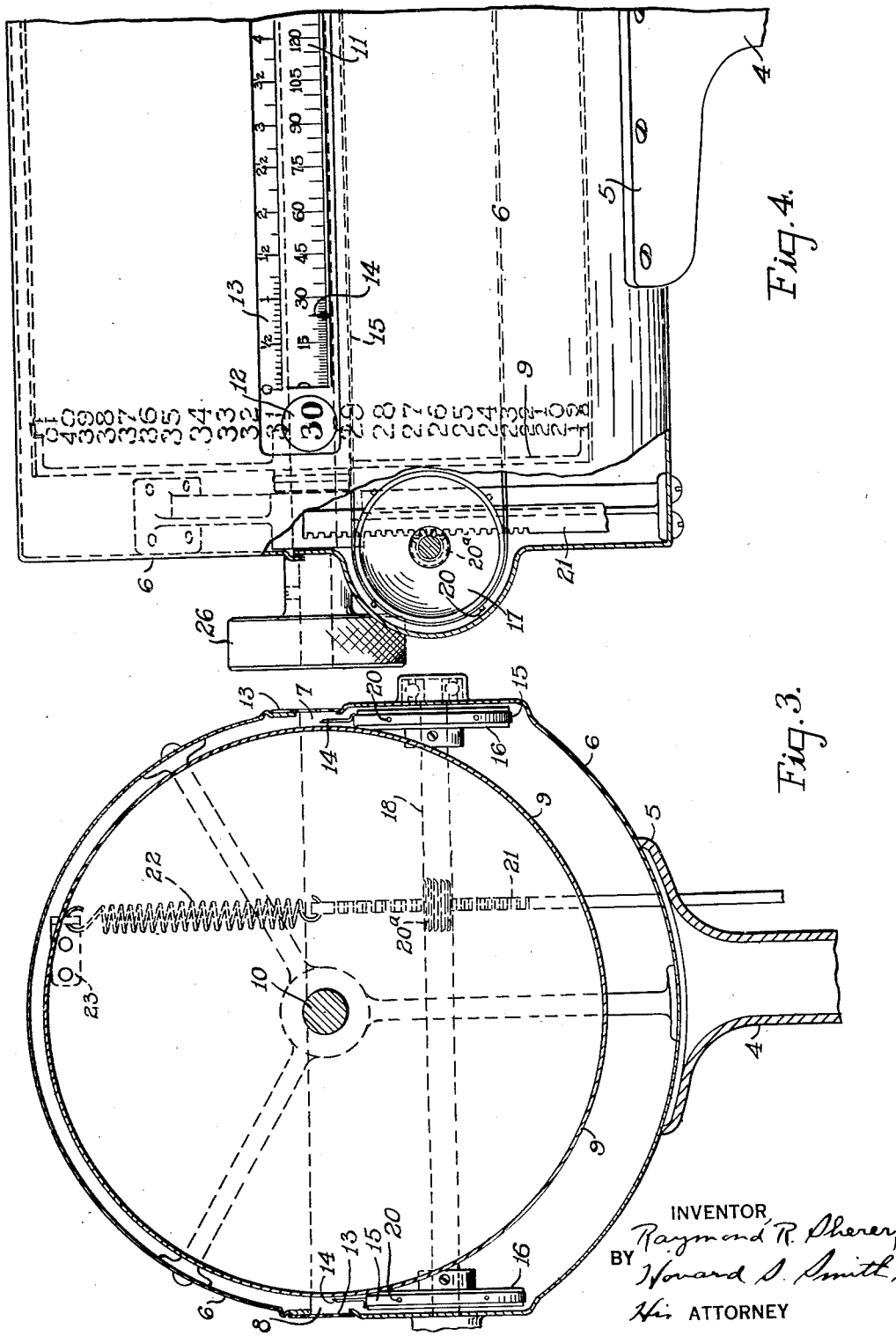

Patented Apr. 26, 1932

1,855,928

UNITED STATES PATENT OFFICE

RAYMOND R. SHERER, OF DAYTON, OHIO

COMPUTING SCALE

Application filed July 31, 1930. Serial No. 472,031.

This invention relates to new and useful improvements in computing scales.

It is the principal object of my invention to provide a computing scale which shows to the customer as well as the merchant or clerk the amount of the customer's purchase in dollars and cents.

It is another object of my invention to provide on the periphery of each semi-spherical part of the scale drum, a graduated price chart that is co-ordinated with an axially movable pointer to give through its respective opening in the drum cabinet or casing, the price in dollars and cents of the article weighed. Therefore, there is visible through these two openings, one before the merchant or the clerk, and the other in front of the customer, the exact amount in dollars and cents of his purchase.

Other important and incidental objects will be brought out in the following specification and particularly set forth in the subjoined claims.

Figure 2:
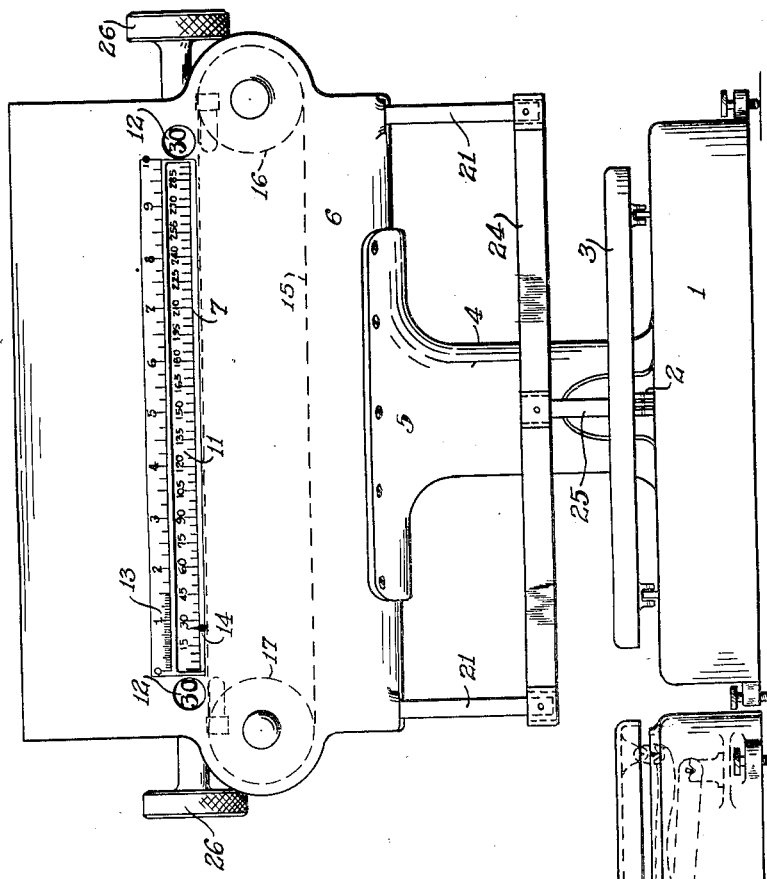
Figure 1:
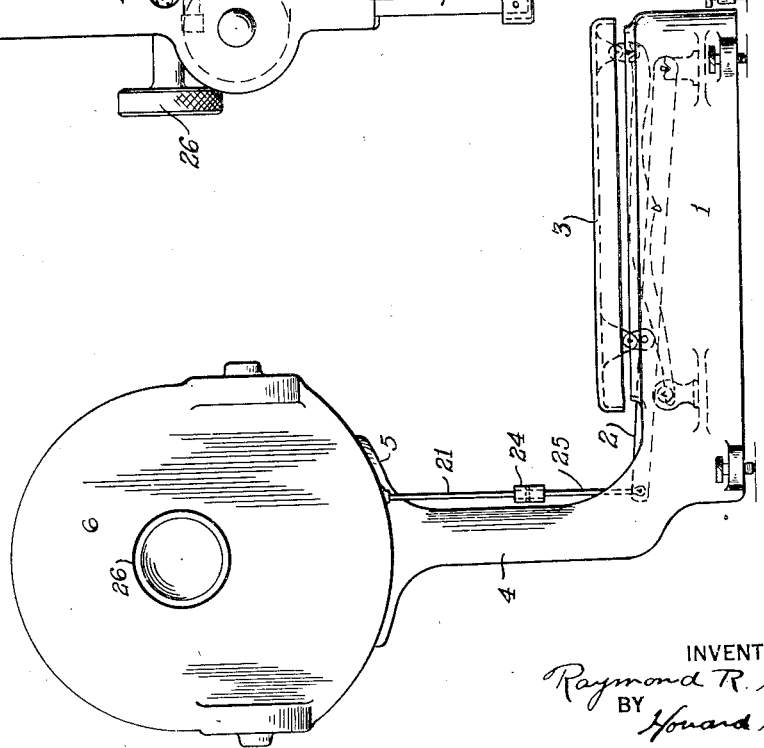

In the accompanying drawings illustrating my invention, Figure 1 is a side view of my dual indicating computing scale. Figure 2 is a rear view of the same, showing the dollars and cents indication that is visible to the merchant or clerk. Figure 3 is a vertical sectional view taken through the drum cabinet and drum, showing the pointer actuating means. And Figure 4 is a modification of applicant's device, being an enlarged view, partly in section, of the drum cabinet, drum and price indicating means on one side of the latter.

In a detailed description of my invention, the numeral 1 designates a base upon which there is fulcrumed a weighing lever 2, included in conventional lever mechanism that supports a platform 3.

Projecting upwardly from the base 1 is a standard 4 which has an outwardly flaring upper end 5 to support a cylindrical cabinet or casing 6.

Formed in the sides of the latter are two side openings 7 and 8, through which a price indication in dollars and cents on a drum 9 is visible. The opening 7 is in front of the merchant or clerk, while the opening 8 is in front of the customer, so that there may be revealed to both the price in dollars and cents of the article weighed upon the platform 3.

The means for making this double indication possible, will now be described. The drum 9, which is secured upon a shaft 10 supported at its ends in the casing 6, carries upon each semi-circumferential portion, a graduated price chart 11. Upon the latter are parallel horizontal rows of total values, in dollars and cents, with the price per pound for each graduated row appearing at each end of it. For example, the price per pound of the article being weighed in Figures 2 and 4 is 30¢, which shows as the numeral 30 through two circular openings 12, 12 in the ends of an elongated frame 13 inserted in the openings 7 and 8.

Each frame 13 is formed with a long slot through which the graduated row of total price values are exposed for the price per pound numerals that are visible through the circular openings 12, 12. Along the upper edge of the total price revealing slot in each frame 13, are graduations indicating pounds and fractions thereof. These graduations are so positioned that they will register with those graduations on the drum representing the amounts arrived at by multiplying the pounds for which they stand with the price per pound indicated through the openings 12.

For the purpose of instantly computing the total price of the article placed upon the scale platform 3, so that it may be indicated both to the customer and the weigher, I provide on each side of the drum, a pointer 14 that is carried by an endless belt 15. The belt on each side of the drum 9 is received by two drums 16 and 17, secured to shafts 18 and 19 respectively supported in the cabinet 6. Pins 20 on the drums 16 and 17 project through apertures in the belts to move the latter in a non-slipping way.

Formed on each one of the shafts 18 and 19 are teeth 20ª which are engaged by a rack 21. At their upper ends the racks 21, 21 are formed with holes to receive the lower hooked ends of helical springs 22 whose upper ends terminate in hook portions that are attached to brackets 23 secured to the end walls of the casing 6.

The racks 21, 21 project downwardly through holes in the casing 6 for attachment to a horizontal bar 24. The latter is secured at its middle portion to the upper end of a rod 25 pivotally attached at its lower end to the lever 2.

In operation, when it is desired to weigh an article, the clerk or merchant places it upon the platform 3. Either before or after this is done, the drum 9 is turned by a knob 26 on the outer end of the shaft 10 to bring the price per pound indication within the openings 12, 12 of each slotted frame 13, so that both the customer and the clerk can see it. When these price per pound amounts show through the openings 12, the row of total value graduations between each two of the price per pound designations will come into view through the slots in the two elongated frames 13.

When the scale platform 3 descends under the influence of the weight of the article placed upon it, the racks 21, 21 will rotate the shafts 18 and 19 to move the two pointers 14 carried by the belts 15 along the total value graduation of the two exposed rows until they stop at the two, one on each side of the drum, which represent the total price in dollars and cents of the artcle. Through the opening 7 in front of the drum cabinet 6 the clerk will see this total price indication, which will at the same time be visible to the customer through the cabinet opening 8 in front of him. Thus honesty, accuracy and fair dealing is promoted by having the total amount of his purchase in dollars and cents revealed to the customer as well as to the weigher of the article purchased.

Having described my invention, I claim:

1. In a scale including a base and a standard, a drum casing mounted upon the latter, a drum rotatable within said casing, a total price chart applied to each semi-circumferential portion of said drum, said casing provided in each side with an opening, through which there is visible a corresponding portion of each total price chart, one pulley at each end of each opening, a belt adapted to travel around the pulleys at the ends of an opening, for movement by one of them along said opening, a pointer carried by each belt for travel along the portion of the chart exposed through each opening, and means operated by the weight of the article weighed for rotating the belt-moving pulleys to move the belts in unison to carry the two pointers to the same total price positions on the charts to reveal one to the customer and the other to the clerk.

2. In a scale including a base and a standard, a drum casing mounted upon the latter, a drum rotatable within said casing, a chart having horizontal rows of total price graduations applied to each semi-circumferential portion of said drum, the graduations on one chart being the same as those on the other chart, said casing being provided in each side with a horizontal opening through which a corresponding part of each chart is visible, a pulley at each end of each opening, a belt adapted to travel around said pulleys at the ends of an opening, for movement by one of them along said opening, a pointer carried by each belt for travel along the row of graduations exposed through said opening on its side of the drum casing, a scale platform, and rack and pinion means operated by said scale platform under the weight of the article weighed for rotating the belt-moving pulleys in unison to cause the belts to carry the pointers to the same total price positions on the charts, to reveal one to the customer and the other to the clerk.

3. In a scale including a base and a standard, a drum casing mounted upon the latter, a drum rotatable within said casing, a chart having horizontal parallel rows of total price graduations applied to each semi-circumferential portion of said drum, said casing being provided on each side with a horizontal opening through which a row of total price graduations will show, a pair of pulleys in said casing on each side of said drum, one pulley at each end of the said openings, a belt adapted to travel around each pair of pulleys, a pointer carried by each belt for movement along its respective opening, a shaft at each end of the casing formed with teeth and carrying one pulley of each pair of pulleys, racks adapted respectively to engage the toothed portion of each shaft, and a scale platform lever connected to said racks for the purpose specified.

In testimony whereof I have hereunto set my hand this 30th day of July, 1930.

RAYMOND R. SHERER.